No. 878,203.
PATENTED FEB. 4, 1908.
J. HARTNESS.
METAL TURNING MECHANISM.
APPLICATION FILED NOV. 27, 1905.
2 SHEETS—SHEET 2.
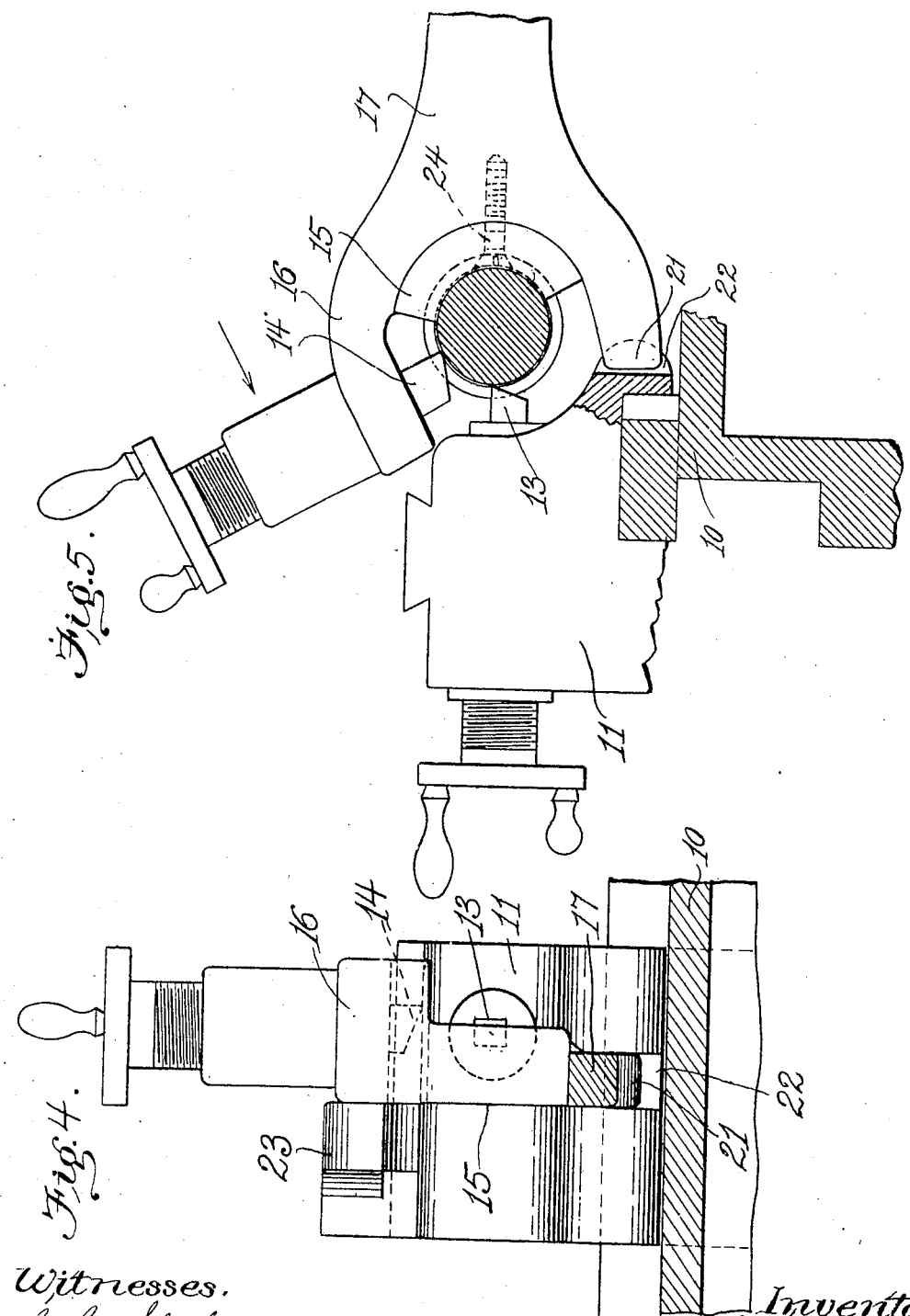

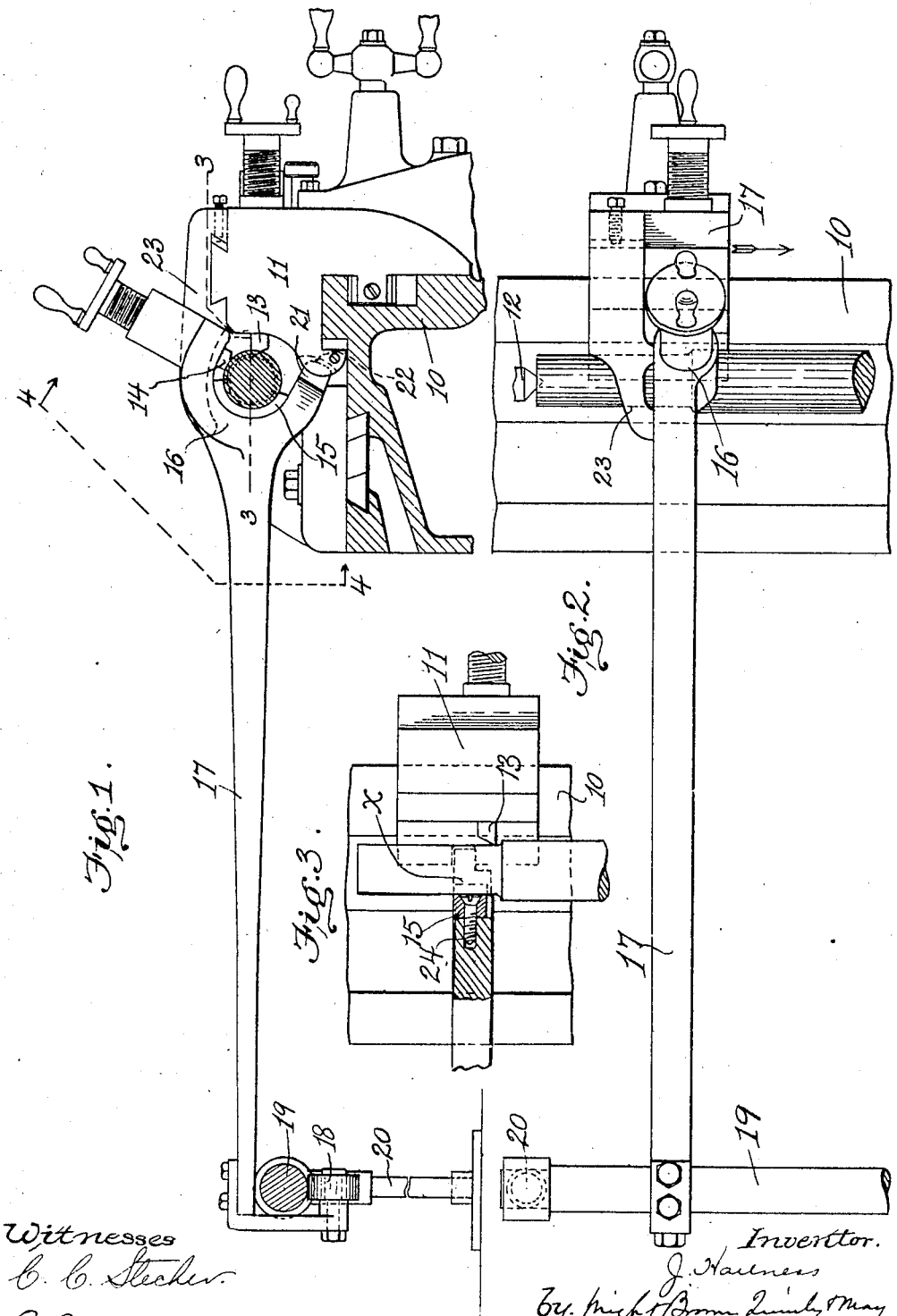

UNITED STATES PATENT OFFICE.

JAMES HARTNESS, OF SPRINGFIELD, VERMONT.

METAL-TURNING MECHANISM.

No. 878,203.        Specification of Letters Patent.        Patented Feb. 4, 1908.

Application filed November 27, 1905. Serial No. 289,192.

*To all whom it may concern:*

Be it known that I, JAMES HARTNESS, of Springfield, in the county of Windsor and State of Vermont, have invented certain new and useful Improvements in Metal-Turning Mechanisms, of which the following is a specification.

This invention has relation to metal turning mechanisms and has for its object to provide a device by which the work, which is held on centers, may be accurately turned so that the product will be of exactly the same cross diameter throughout, and will, at the same time, be straight.
The present invention will be used to the greatest advantage on work, in which the length will not exceed, say, from 12 to 20 times its diameter. In turning bars of this character it is possible to use a single tool taking a light cut, without the use of back rests, since under these conditions the tool does not cause the work to spring between the centers. Where, on the contrary, it is attempted to use on such work, a roughing tool, which removes a large chip by a deep cut, the work is sprung between the centers by the strain of the tool so that the product is not straight from end to end. It is a well known fact that a piece of metal will run truer (*i. e.* its periphery will always be concentric with a line connecting the centers of its ends,) if turned on centers with a single cutting point, than when, with such point, is used a back rest for steadying the work.
Where a back rest is used in connection with centers, although it holds the work firmly against the tool, yet it is found that after turning a slender shaft, the work does not run as true as it would had the tool taken its cut without the aid of the back rest. The diameter of the work, of course, is more accurate, but the shaft produced is not straight.

I propose, according to the present invention, to use in combination two cutters, to wit: a heavy roughing cutter which will rapidly reduce the work, and second, a light truing cutter which could by itself be used to remove a light chip without springing the work. I propose that the truing cutter shall closely follow the roughing cutter and that the roughing cutter shall be gaged or controlled by the trued or finished portion of the work. In the simplest form of the invention I utilize a work rest which is rigid relatively to the roughing cutter and which takes its bearing upon the trued portion of the work,
so that it closely follows the light or truing cutter. The truing cutter may be mounted upon the usual lathe slide or carriage, whereas the roughing cutter and its back rest, though moved axially by the side slide, is nevertheless mounted independently thereof and supported by the work. In order to overcome the springing of the work by the lifting action of the roughing cutter, the back rest which bears against the work is mounted in a relatively long arc which projects laterally or transversely away from the work, so that the torsional thrust of the work is overcome and the lifting strain is reduced to a minimum. To the end of the lever may be attached a weight, or the end of the lever may bear upon a guide to prevent its being raised or lowered, and the lifting thrust of the cutter on the work is only equal to the pressure on the end of the lever to keep it from rotating. There is a loose connection between the lathe slide which carries the light or truing cutter and the back rest or lever last referred to, so that the operation upon the work consists in feeding along the roughing tool, which is closely followed by the light or truing cutter, and which is in turn followed by the back rest which bears upon the surface trued by the truing tool and gages or controls the roughing cutter.

Referring to the accompanying drawing which illustrates one embodiment of the invention, Figure 1 represents a portion of a lathe in transverse section and illustrates my improved turning mechanism: Fig. 2 represents the same in plan view: Fig. 3 represents a section on the line 3—3 of Fig. 1: Fig. 4 represents a section on line 4—4 of Fig. 1: Fig. 5 is an enlarged view illustrating the operation of the cutters upon the work.

Referring to the accompanying drawings 10 represents the bed of a lathe and 11 represents a tool slide or carriage mounted to slide thereon. The bed and carriage may be of any ordinary design, those which I have illustrated being set forth in detail in my co-pending application, Serial No. 269,447, filed July 13, 1905. The work is adapted to be held between centers or any two bearings which will preferably be near the ends of the work, a center being indicated at 12. On the slide 11 is mounted a cutter 13 which I may term a truing cutter, which is adapted to remove from the work a light or small chip. Upon the slide being moved along the bed by any suitable feeding mechanism this cutter 13 would remove a small chip without springing the work between the centers.

14 indicates a roughing cutter, that is, one that will remove the large or heavy chip. In conjunction with this cutter I utilize a work rest or back rest 15. The cutter 14 and the back rest 15 are mounted on or held by a single holder 16 which may be yoke-shaped as shown in Fig. 1. This holder 16 is provided with a long arm 17 which extends rearwardly some distance beyond the work, and which carries upon its extremity a roller 18 adapted to bear against a guide 19, supported in standards 20 in the rear of the lathe bed; a weight may be used in lieu of a guide. The holder 16 is provided with a rib or projection 21 which extends loosely into a groove 22 on the rear side of the slide 11. In addition to this loose connection, between the holder 16 and the slide 11, I provide the slide with a pusher or actuator 23 which is clamped or otherwise secured to the top of the tool slide, and which extends rearwardly therefrom to bear against the holder 16 at two or more different points on either side of a vertical plane co-incident with the axis of the work. The cutter 13, the cutter 14 and the work rest 15, are disposed in different vertical planes transverse to the axis of the work so that when the tool slide is moved along these parts travel relatively to the work in the following order: first, the heavy roughing cutter, second, the light or truing cutter, and third, the back rest 15. The back rest itself bears upon the trued portion of the work which is indicated at x so that the position of the point of the roughing cutter is determined or controlled by the trued portion of the work. Assuming that the work is 2¼ inches in diameter and 30 inches in length, and that the mean radius of action of the roughing tool is about 1 inch from the center of the work, then at this distance the pressure of the roughing cutter or the work would be in the neighborhood of, say, 2,000 lbs. This is not only a severe strain upon the tail center when the operation is begun, but at the same time the strain is sufficient to lift or bend the bar and prevent accurate work. Now, by providing the elongated arm or lever 17, the lifting or bending strain may be correspondingly reduced so that instead of being 2,000 lbs. it will be reduced to ,say, 40 lbs., to wit: the weight or pressure which is necessary to hold the end of the lever from moving upward.

The action of this device may be compared somewhat crudely to the action of a pipe wrench. Assuming that the pipe wrench is placed upon a pipe, the ends of which are clamped against movement, should the operator grasp the handle of the wrench close to the jaws and lift upwardly, there would be a slight tendency of the wrench to rotate the work, but the strain would be of such character as to lift and bend the pipe. If the hand of the operator were moved, say to a point about one foot away from the point, and the end were moved upward, there would be a greater tendency to rotate the work and the lifting or bending strain would be correspondingly reduced. If the hand of the operator were moved along the handle to a point three feet from the pipe and moved upward, there would be little or no bending strain upon the pipe, but the tool would either rotate about the pipe or else rotate the pipe with it. This is substantially the case with my hereinbefore described device. Assuming, for instance, that the strain of the cutter 14 against the work at an inch radius from the work is 2,000 lbs.; then if a person should attempt to hold the lever 17 with his hand placed two inches from the axis of the work, he would experience a strain of 1,000 lbs. If he could hold his hand without moving so as to resist this enormous strain, the work would be lifted or sprung upwardly. As he moved his hand away from the axis of the work the strain experienced by him would decrease, so that the bending or lifting strain upon the work would gradually grow less and less until it was practically $nil$, depending of course upon the length of the arm or lever 17. Thus in my device the lifting thrust or strain is borne by a back rest bearing upon the work, the back rest and the cutter being so mounted and held upon an arm or lever that the lifting or bending strain of the cutter upon the work is practically eliminated.

Although I have shown my device as provided with a lever which extends in one direction only, yet the device would operate as well if not better if I employed two levers extending in opposite directions so as to get a balanced pull which would wholly eliminate the tendency to lift the work; but for convenience I have chosen a single lever which reduces the lifting tendency to about one-fiftieth of that ordinarily exerted by the roughing cutter. By extending the lever rearwardly from the lathe, the strain tends to depress the work rather than to lift it, and this will in a measure be counterbalanced by the lifting tendency of the truing or finishing cutter.

I have illustrated the invention in its simplest form, and have shown the parts more or less conventionally; for instance, I have shown the back rest as consisting of a segment of a bushing held in place by a countersunk head screw 24, but it will be understood that in lieu thereof I may employ roller back rests for high speed steels. I do not limit myself to any particular form of roughing cutter, or to any number of such cutters, for it will be readily understood that I may utilize a plurality of such cutters in a holder such as described with the proper number of back rests and accomplish the same end, that is, the reduction of the lifting tendency of a heavy cut. In actual practice it will probably be advisable to start the cut with the finishing or truing cutter, which will be allowed to take a cut of, say, one-half of an inch on the end of a shaft at the tail center; then the balanced roughing tool will be placed upon the work and engaged with the tool carriage so that it will be pressed forward by the pusher 23 which holds it a short distance in advance of the finishing cutter. If desired, however, means for temporarily controlling the roughing cutter radially by the carriage would make it possible for the roughing cutter to be used in starting the operation.

Various changes may be made in the details which I have illustrated and described without departing from the spirit and scope of the invention. The terms which I have employed are for the purpose of description and not of limitation, and I do not limit myself to the precise construction and arrangement of parts, which I have chosen to illustrate and describe as one form of my invention.

Having thus explained the nature of the invention, and explained a way of constructing and using the same, although without attempting to set forth all of the forms in which it may be made, or all of the modes of its use, what I claim is:

1. In a lathe in which the work is held in end bearings, the combination with a slide or carriage and a finishing cutter thereon, of a holder carrying a roughing cutter and a rest in different planes along the work and adapted to be supported by the work independently of said carriage, and means on the slide for maintaining said finishing cutter in a position between the rest and the roughing cutter.

2. In a lathe in which the work is held in end bearings, the combination with a bed, a slide or carriage guided on the bed and a finishing cutter thereon, of a roughing cutter arranged to precede the finishing cutter, a rest arranged to follow the finishing cutter and bear against the finished work, and a holder for the roughing cutter and the rest for holding them in said relative positions.

3. An attachment for a lathe comprising a holder, a rest and a cutter mounted and held in predetermined relation on said holder, and adapted to be supported by the work, and an arm or lever on said holder for eliminating the lifting or bending strain of the cutter on the work, said rest and cutter being separated in lines axial of the work, whereby they may be employed in connection with an intervening finishing cutter carried by a slide on the bed.

4. In a lathe, a tool-slide, a finishing cutter thereon, a roughing cutter, a rest for the roughing cutter, a holder for said roughing cutter and said rest, said holder being adapted to be supported by the engagement of the rest and the cutter with the work, a pusher on the slide for moving the holder, and a lifting-strain-eliminating arm or lever on the holder, said roughing cutter, said finishing cutter and said rest being arranged and adapted to engage the work in the order named.

5. A lathe comprising a bed, a slide guided thereon, a finishing cutter mounted on said slide, a roughing cutter and means connected to the roughing cutter for balancing the lifting or bending strain of the roughing cutter on the work, said roughing cutter and said means being adapted to be supported by the work, and said means being arranged to engage the finished portion of the work for controlling the radial position of said roughing cutter.

In testimony whereof I have affixed my signature, in presence of two witnesses.

JAMES HARTNESS

Witnesses:
  W. B. MAY,
  C. C. STECHER.